United States Patent
Xu et al.

(10) Patent No.: US 7,577,090 B2
(45) Date of Patent: Aug. 18, 2009

(54) METHOD AND SYSTEM FOR PROVIDING AVAILABILITY AND RELIABILITY FOR A TELECOMMUNICATION NETWORK ENTITY

(75) Inventors: Jianming Xu, Plano, TX (US); Charles Marvin Berteau, Plano, TX (US); Ghassan Naim, Garland, TX (US); Seshagiri Rao Madhavapeddy, Richardson, TX (US); Pardeep Kohli, Plano, TX (US); Shiang Yueng Feng, Colleyville, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 10/597,950

(22) PCT Filed: Feb. 14, 2005

(86) PCT No.: PCT/US2005/004422

§ 371 (c)(1),
(2), (4) Date: Aug. 14, 2006

(87) PCT Pub. No.: WO2005/081447

PCT Pub. Date: Sep. 1, 2005

(65) Prior Publication Data

US 2007/0165516 A1 Jul. 19, 2007

Related U.S. Application Data

(60) Provisional application No. 60/544,622, filed on Feb. 13, 2004, provisional application No. 60/640,844, filed on Dec. 30, 2004.

(51) Int. Cl.
*H04L 1/22* (2006.01)
*H04L 12/26* (2006.01)

(52) U.S. Cl. ...................... 370/219; 370/220

(58) Field of Classification Search ................. 370/217, 370/218, 219, 220
See application file for complete search history.

(56) References Cited

U.S. PATENT DOCUMENTS

| | | | |
|---|---|---|---|
| 7,334,064 B2* | 2/2008 | Davies et al. | 710/62 |
| 2002/0165944 A1* | 11/2002 | Wisner et al. | 709/220 |
| 2003/0061319 A1* | 3/2003 | Manzardo | 709/221 |

* cited by examiner

*Primary Examiner*—Melvin Marcelo

(57) ABSTRACT

Geographical redundancy and an efficient switchover process to redundant equipment (210) is achieved by separating active main equipment (220) and standby redundant equipment in different geographical locations so that failures can be avoided in the event of a natural disaster or other event that affects an entire building or region. In addition, partial switchover can be performed for components or functions that become inoperative to corresponding redundant components in the standby equipment. To provide further redundancy and prevent unneeded switchovers, status or heartbeat messages are transmitted between the active main equipment and standby redundant equipment over two different networks.

21 Claims, 15 Drawing Sheets

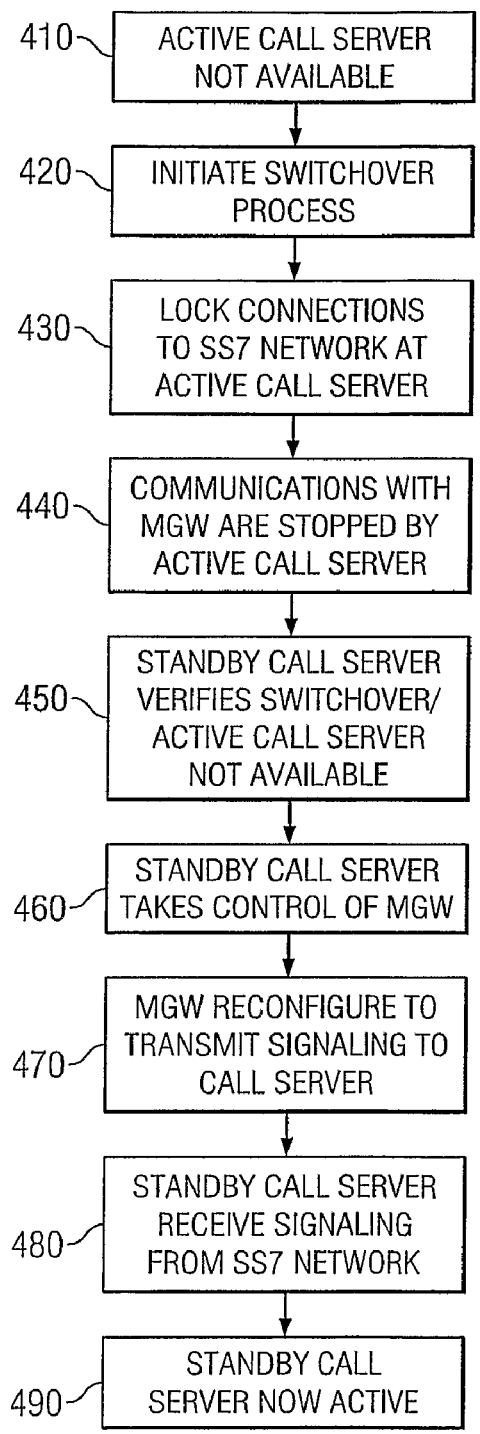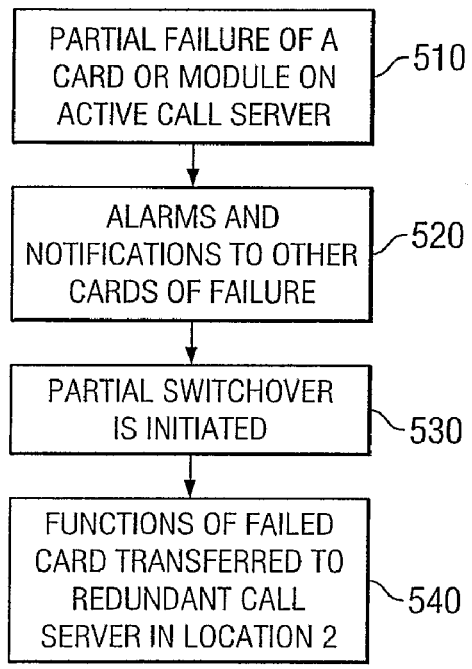

METHOD AND SYSTEM FOR PROVIDING AVAILABILITY AND RELIABILITY FOR A TELECOMMUNICATION NETWORK ENTITY

CROSS-REFERENCE TO RELATED APPLICATIONS

This application claims the benefit of the filing date of co-pending provisional application U.S. Ser. No. 60/544,622, filed Feb. 13, 2004, entitled, "Method and System for Providing Availability and Reliability for a Telecommunication Network Entity," to Jianming Xu, et al. and the benefit of the filing date of co-pending provisional application U.S. Ser. No. 60/640,844, filed Dec. 30, 2004, entitled, "Method and System for Providing Geographic Redundancy," to Jianming Xu, et al., both of which are incorporated by reference herein.

BACKGROUND OF THE INVENTION

1. Technical Field

The present disclosure relates generally to a method and system for a telecommunications network entity and, more particularly, to a method and system for providing redundancy in a telecommunications network entity.

2. Description of the Related Art

In telecommunication systems, the performance of a network entity (e.g., a serving entity) such as a switch may be judged by its availability and redundancy capabilities. Generally, such systems are designed to operate with the full capacity of such serving entities available at all times. Taking a telecommunication switch as an example, certain components may be rendered to failure, and may reduce the capability of the switch to support a full load of traffic at which the switch is designed to handle. This problem may lead to the disconnection of a certain number of users who are using the switch during a call and may prevent a certain number of new users from making new calls. This problem may result in a lack of availability of services in emergency situations that affect whole geo-locations, such as natural disasters (e.g., an earthquake, tsunami, etc.). Generally, the longer the down time of the telecommunications network, the larger the financial losses to the network operator and the higher the impact on the human lives in our society. Accordingly, the operational abilities of a serving entity are important in the network because it aids in defining the reliability factor of a communication between two parties, and its failure may lead to the loss of calls and data information.

A known network configuration of a partial solution for providing redundancy of a network entity is illustrated in FIG. 1. The network 100 illustrated in FIG. 1 includes redundancy protection by duplicating all the hardware and software of an active main entity 110, and installing a standby redundant or duplicate entity 120 in relatively close proximity to the active main entity 110. For example, the active main entity 110 and standby redundant entity 120 are generally in the same physical location 160, such as in the same building and connected by a private local area network 130. If the active main entity 110 becomes inoperative, e.g. unable to function properly, the redundant entity 120 becomes active and takes over all the services. However, this solution may be unworkable in the event of a natural disaster that affects the entire location 1. It is also relatively expensive given that a network operator has to purchase twice the amount of hardware and software for the functionality of a single entity.

In addition, this solution does not efficiently handle partial failure of the active main entity 110. In other words, if only some of the components in the active main entity 110 are out of service, the known solution is to completely shutdown the active main entity 110 and activate the redundant entity 120. However, this is not an efficient solution given that all the components that did not fail in the main active entity 110 become non-useable after the service is switched to the redundant entity 120. There is also no mechanism for active calls at active main entity 110 to survive in the event of its failure. Furthermore, redundant trunks also need to be provided at the redundant entity 120 with alternate routes. This redundancy further increases the operational costs and complexity in network design.

Another disadvantage is that known solutions do not provide any means for automatic switchover from the main entity 110 to the redundant entity 120. Often the failure must be determined by a network operator and the switchover performed manually.

Therefore, there is a need for a method and system for maximizing the availability time of the full capacity of a telecommunications entity, even in the event of an emergency situation that affects an entire region. Moreover, an efficient method of redundancy is needed that maximizes the use of operational components of a telecommunications entity in the event of failure of just one or more of its components and provides a more reliable means for switchover.

BRIEF SUMMARY OF THE INVENTION

The present invention provides for geographical redundancy between a first network entity at a first location and a second network entity at a second location. Preferably, the two locations are separated by sufficient distance so that natural disasters or other events that affect one location will most likely not affect the other location. Each network entity transmits a primary heartbeat or status message over an IP network on a periodic basis. If no primary heartbeat message has been received from a network entity after a certain configurable time period, then a secondary heartbeat or status message can be transmitted over a signaling network, such as an SS7 network, on a periodic basis. If there is still no response from the first active network entity after a certain configurable time period, a switchover of traffic control from the first network entity to the second network entity can be initiated.

Partial switchover from the first network entity to the second network entity is also provided when the first network entity is only partially inoperative, e.g. when only one specific type of card has become inoperative. The first network entity transmits a message over the IP network to the second network entity to initiate switchover to the same specific type of card in the second network entity. The first network entity then informs the other cards in the first network entity to redirect messages to the same specific type of card in the second network entity.

BRIEF DESCRIPTION OF THE SEVERAL VIEWS OF THE DRAWINGS

FIG. 2b illustrates one embodiment of an exemplary call server in the network architecture of FIG. 2a.

FIG. 2c illustrates another embodiment of an exemplary call server in the network architecture of FIG. 2a.

FIG. 4a illustrates an exemplary switchover process when the main call server is unavailable.

FIG. 5a illustrates an exemplary partial switchover process when only a portion of the main call server is unavailable.

DETAILED DESCRIPTION OF THE INVENTION

Figure 1:
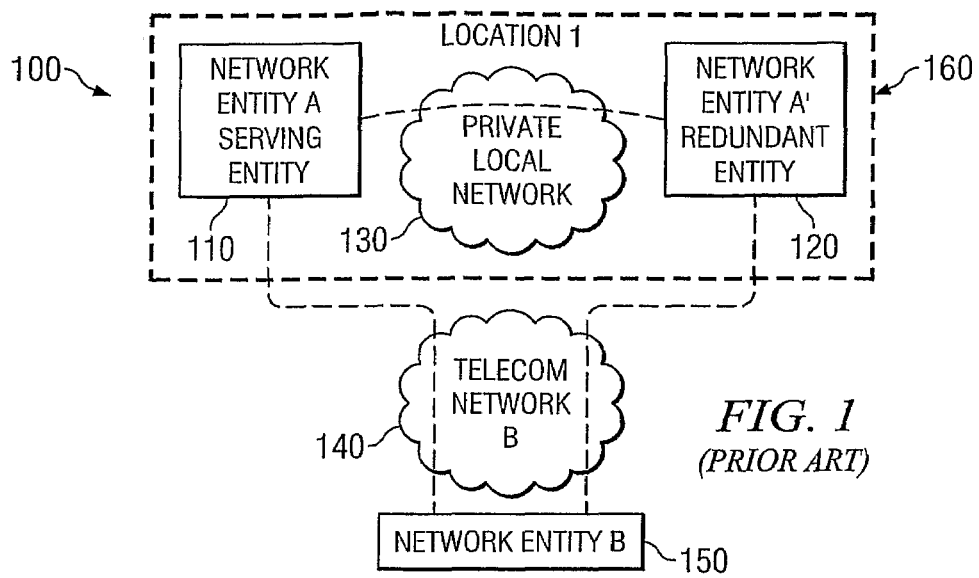
FIG. 1 illustrates an example of a known solution for providing redundancy of a network entity.

The present disclosure relates generally to a method and system for a telecommunication node and, more particularly, to a method and system for providing geographical redundancy in a telecommunication network entity in an efficient manner. Specific examples of components and arrangements are described below to simplify the present disclosure. These are, of course, merely examples and are not intended to be limiting. In addition, the present disclosure may repeat reference numerals and/or letters in the various examples. This repetition of like numerals for similar parts is for the purpose of simplicity and clarity and does not in itself dictate a relationship between the various embodiments and/or configurations discussed. It is to be understood that the following disclosure provides one or more embodiments, and that there may be many different embodiments, or examples, for implementing different features of the disclosure as encompassed by the claims.

For the purposes of illustrating the present disclosure, various acronyms are used, the abbreviations of which are listed below:

| ACM | Address Complete Message |
|---|---|
| ANM | Answer Message |
| BSS | Base Station System |
| BSSAP | Base Station System Application Part |
| BSSMAP | Base Station System Management Application Part |

-continued

| CCM | Call Control Module |
|---|---|
| DDM | Data Distribution Module |
| DTAP | Direct Transfer Application Part |
| ESM | Ethernet Switching Module |
| GSM | Global System for Mobile communications |
| IAM | Initial Address Message |
| IP | Internet Protocol |
| ISUP | ISDN User Part (of SS7) |
| ISDN | Integrated Services Digital Network |
| MO | Mobile Originated |
| MS | Mobile Station |
| MSISDN | Mobile Station International ISDN Number |
| OPC | Originating Point Code |
| PC | Point Code |
| REL | Release |
| RLC | Release Complete |
| $R_p$ | Route Primary |
| $R_s$ | Route Secondary |
| SAM | Session Administration Module |
| SCCP | Signaling Connection Control Part. An SCCP message may carry BSSMAP, DTAP or other similar messages. |
| SDH | Synchronous Digital Hierarchy |
| SIM | SS7 Interface Module |
| SNMP | Simple Network Management Protocol |
| SONET | Synchronous Optical Network |
| SS7 | Signaling System Number 7 |
| STP | Signaling Transfer Point |
| TDM | Time Division Multiplexing |
| UDP | User Datagram Protocol |
| VLR | Visitor Location Register |
| WMG | Wireless Media Gateway |

The invention provides for geographical redundancy and an efficient switchover process to redundant equipment. By separating active main equipment and standby redundant equipment in different geographical locations, failures can be avoided in the event of a natural disaster or other event that affects an entire building or region. In addition, the present invention provides for partial switchover of only components and functions that are inoperative to the corresponding redundant components in the standby equipment. To provide further redundancy and prevent unneeded switchovers, status or heartbeat messages are transmitted between the active main equipment and standby redundant equipment over two different networks. The present invention and its advantages are best understood in relation to FIGS. 1-6 of the drawings and the following description.

Figure 2B:
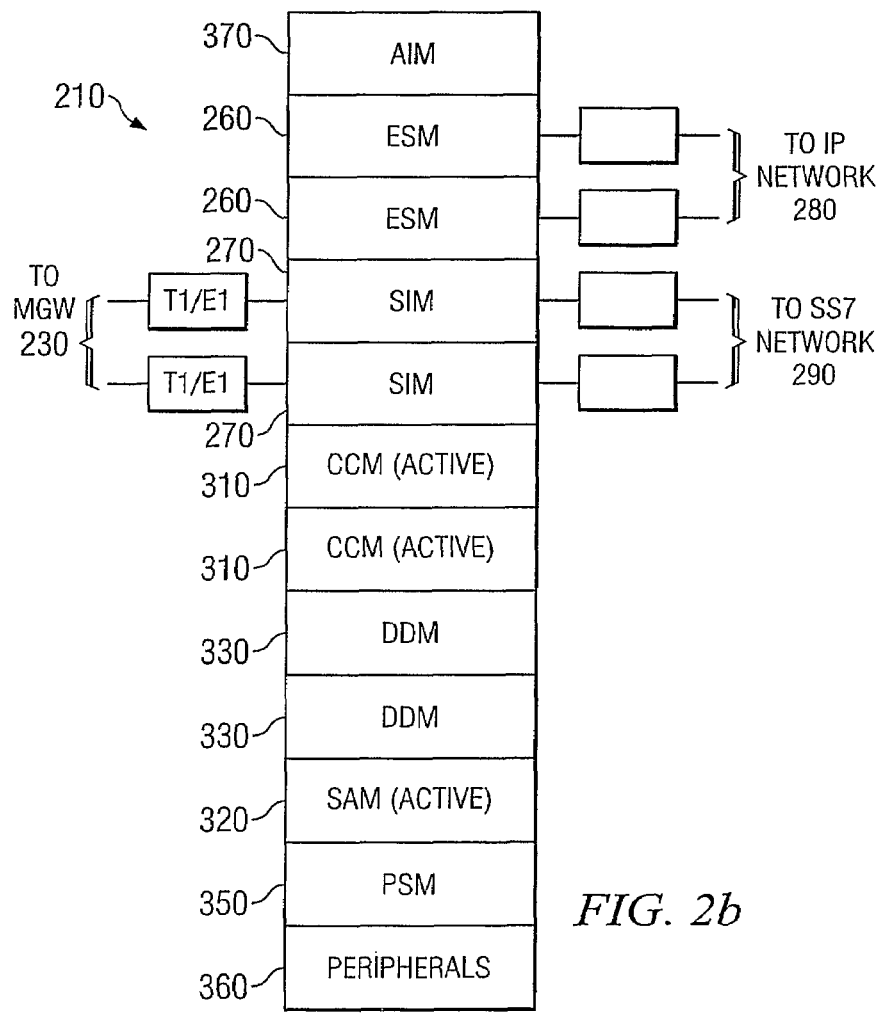
Figure 2A:
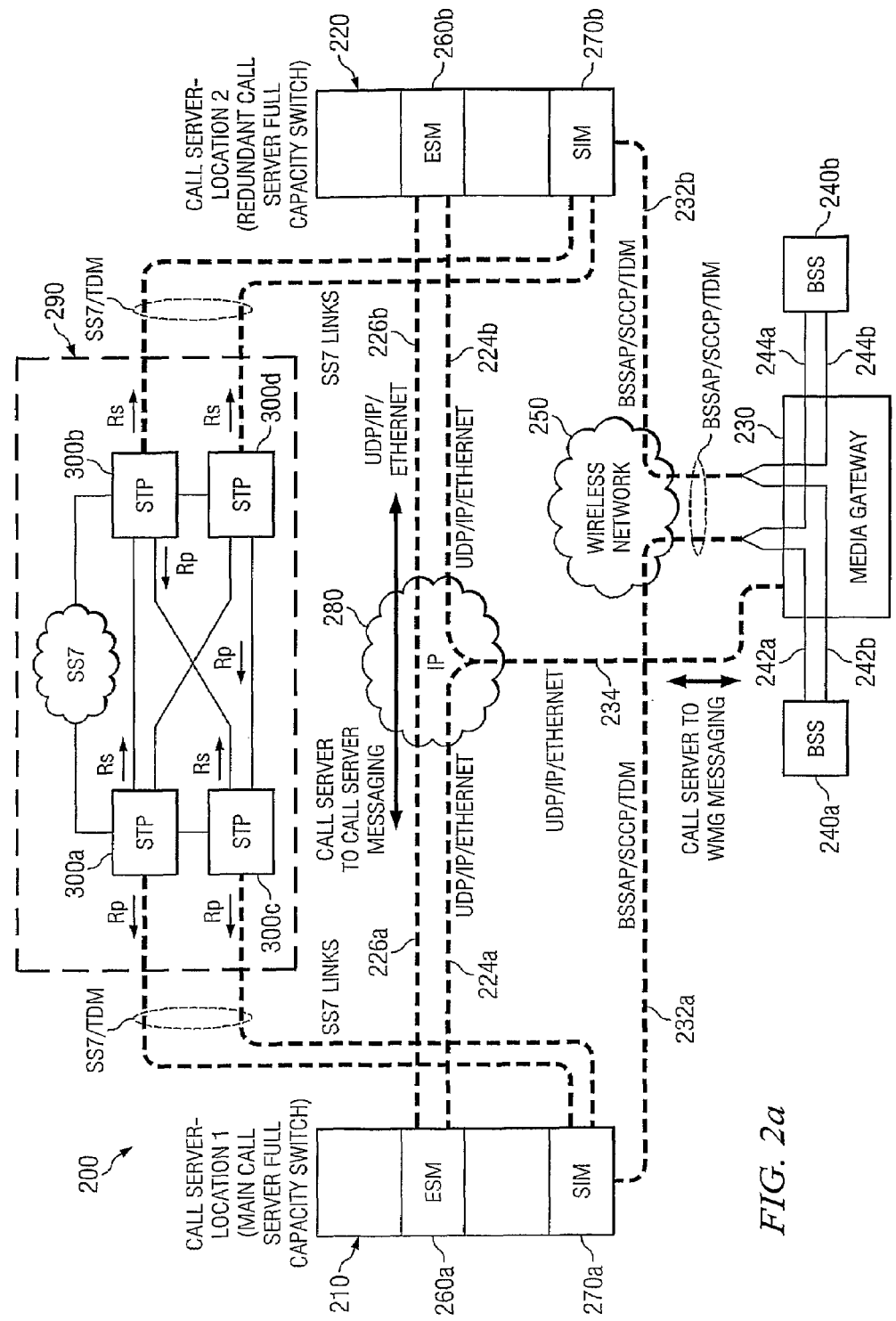
FIG. 2a illustrates one embodiment of a network architecture for providing geographical redundancy in a telecommunications system in accordance with the present invention.

Referring to FIG. 2a, in one embodiment, an exemplary network architecture 200 is illustrated in accordance with the present invention for providing geographical redundancy in an efficient manner. In the present examples, the architecture is applied to a Soft-switch Mobile Serving Center (MSC), but it is understood that the architecture may be implemented using other types of network equipment and components. The illustrated soft-switch includes a Call Server 210 at a first location 1 and a Wireless Media Gateway (WMG) 230. It is noted that the Call Server 210 and the WMG 230 both include Soft-switch functionality. Though the Call Server 210 and WMG 230 are shown in FIG. 2 as separate hardware devices, the Call Server and WMG functionality may also be included in one hardware device. The Call Server 210 is responsible for all call processing and management, as well as controlling the WMG 230. The WMG 230 is responsible for setting up and establishing a connection for any given type of call upon the call server's request.

In addition to the Call Server 210 in the first location 1, another redundant call server 220 is illustrated in a second location 2. Location 1 and location 2 are separate geo-locations. For example, location 1 may be in Dallas, Tex. and location 2 may be Chicago, Ill. Preferably, the geo-locations are separated by sufficient distance (e.g. approximately 30 miles or more) so that natural disasters or other events that affect one geo-location will most likely not affect the other geo-location. In this example, in normal operation, the call server 210 in location 1 is the active call server and the redundant call server 220 in location 2 is the standby call server. Preferably, the redundant call server 220 has the same hardware configuration as the main call server 210. The active call server controls the MGW 230 and performs call control signaling for voice and data calls.

The call servers can communicate control messages with the WMG 230 over the IP network. The WMG 230 communicates with the main call server 210 through connection 234 to the IP network 280 and connection 224a from the IP network to the main call server 210. The WMG 230 communicates to the redundant call server 220 through connection 234 to the IP network 280 and connection 224b from the IP network to the redundant call server 220. Preferably, the link 234 to the IP network 280 has a redundant counterpart connected to a redundant port on the WMG 230. The active call server uses one or more IP addresses to send management and administrative messages over the IP network 280 to the MGW 230 depending on the number of ports connecting the MGW 230 to the IP network 280. The MGW 230 has the same IP address regardless of the active call server, i.e. the same IP address is used by either the main call server 210 or the redundant call server 220, whichever is active at the time, to transmit control messages to the MGW 230 over the IP network 280. In addition, each of the call servers 210 and 220 has one or more IP addresses assigned to it, depending on the number of ports each one has connected to the IP network. The MGW 230 uses the assigned IP addresses of the active call server to transmit management and administrative messages (such as in SNMP protocol or other appropriate protocol) to it. The MGW 230 does not transmit messages to the standby call server, as explained in more detail below. The IP network 280 is also used to exchange management and administrative messages between the main call server 210 and the redundant call server 220 over links 226a and 226b.

In addition to the IP network connections, the call servers 210 and 220 communicate signaling information with the WMG 230 over signaling links 232a and 232b respectively over the wireless network 250. Again, the MGW 230 only transmits signaling information to the call server that is currently active, as explained in more detail below. The WMG 230 also connects to one or more base station systems (BSS) 240 over links 242 and 244. In this example, two BSS 240 are illustrated, though more BSS 240 may be connected to the WMG. The WMG 230 acts as a cross-connect entity wherein the signaling channels on the links 242 and 244 with the BSS 240 are extracted and cross connected to the call servers 210 and 220. For example, BSS 240a is connected to the WMG 230 by signaling links 242. BSS signaling channels from link 242 are extracted and cross connected to be transmitted over the wireless network 250 to the main call server 210. The same functions are performed for BSS 240b. BSS signaling channels from link 244 are extracted and switched for transmission over the wireless network 250 to the main call server 210. Links 232, 242 and 244 are preferably TDM links such T1/E1 or SONET/SDH links but may be any other appropriate type or protocol. The BSS message transmission via the wireless network 250 is accomplished through known protocols, such as BSSAP and SCCP over TDM.

FIG. 2a also illustrates a signaling network 290 that is shown in this embodiment as an SS7 network though it may be of any other type of signaling network. The SS7 network includes STPs 300a, 300b, 300c and 300d. The STPs 300 are part of the SS7 network 290 and act as transfer points between the call servers 210, 220 and the destination of messages from the call servers 210, 220. As part of the solution presented in the present embodiment, the main server 210 and the redundant call server 220 each have their own SS7 Point Code as well as a common Alias Point Code for addressing in the SS7 network. The individual SS7 Point Codes are used to transmit heartbeat status messages over the SS7 network as described in more detail with reference to FIG. 6. The Alias Point Code is used by the SS7 network 290 to support the geographical redundancy solution presented herein. The STP nodes are configured such that all signaling messages from the SS7 network 290 are routed to the active call server using the Alias Point Code. Two routes are assigned to the Alias Point Code, a Primary route ($R_P$) that terminates at the main call server 210 and a secondary route ($R_S$) that terminates at the redundant call server 220.

Signaling messages terminating to the main call server 210 follow the Primary route ($R_P$) shown in FIG. 2a. The primary route $R_P$ includes two route diverse paths connecting the main call server 210 to the SS7 network 290. Signaling messages terminating to the redundant call server 220 follow the Secondary route ($R_S$) shown in FIG. 2a. The secondary route $R_S$ also includes two route diverse paths connecting the redundant call server 210 to the SS7 network 290 as seen in FIG. 2a. When the active call server 210 or the Primary route $R_P$ is not otherwise operational, then the SS7 network 290 transmits signaling messages over the Secondary route $R_S$ to the redundant call server 210 using the same Alias Point Code.

FIG. 2b illustrates one embodiment of the main call server 210. Since there may be other cards or modules of various types in a call server, FIG. 2b illustrates only an example of the types of cards that can be used to implement the present invention. Main call server 210 includes the following modules or cards: ESM cards 260, SIM cards 270, CCM cards 310, SAM cards 320 and DDM cards 330. The ESM cards 260 are the interface to the IP network 280 and are used to send any message from the call server 210 to the IP network 280 and receive any message from the IP network 280. Each ESM card 260 has its own IP address, and two ESM cards 260 with two different IP addresses are preferably used to provide redundancy.

The SIM cards 270 are the interface for signaling links to the SS7 network 290 and the Wireless network 250. The SIM cards 270 distributes signaling loads among DDM cards 330. Each SIM card 270 can forward signaling information to any of the DDM modules within the network entity 210. To provide redundancy, two SIM cards 220 are used to provide two connections to the MGW 230 over the wireless network 250 and two more SIM cards 220 used to connect to two different STPs 300 in the SS7 network 290.

The DDM card 330 receives messages from the SIM card 310 and distributes the messages to the appropriate CCM card 310. Each DDM card 330 uses a message distribution process to forward a particular call instance to one CCM card 310 for the complete duration of the call for a specific subscriber. The CCM cards 310 provide call processing for any type of call, voice or data, mobility management, VLR functionality and signaling gateway functions. Mobility management includes the processes necessary for mobile users, such as updating location, handoffs from one cell to another, etc. while the VLR is a database for information on subscribers currently using the system resources.

The SAM card 320 performs the operations, maintenance and administration (OAM) functions and billing functions of the call server 210. It monitors the status of all other cards in the call server 210 and informs the CCM card 310 about available resources for the WMG 230. The SAM card is also interfaces with peripheral devices 360 such as CD-ROM, disk drive, fan, etc.

Additional cards or modules include an alarm indication module (AIM) 370 for providing a physical display of alarms and faults generated by any of the cards within the call server 210. A power supply card or module (PSM) 350 distributes power to the cards within the call server 210.

In the embodiment in FIG. 2b, the main call server 210 does not include any redundant or standby cards. Any required standby or redundant cards are located only in the redundant call server 220 shown in FIG. 2a. The redundant call server 220 has a similar hardware configuration with the same type of cards as in the main call server 210. Again, it does not include extra redundant or standby cards for example, for the CCM and SAM cards. Thus, there is a more efficient use of equipment to provide geographical redundancy than in known solutions.

Figure 2C:
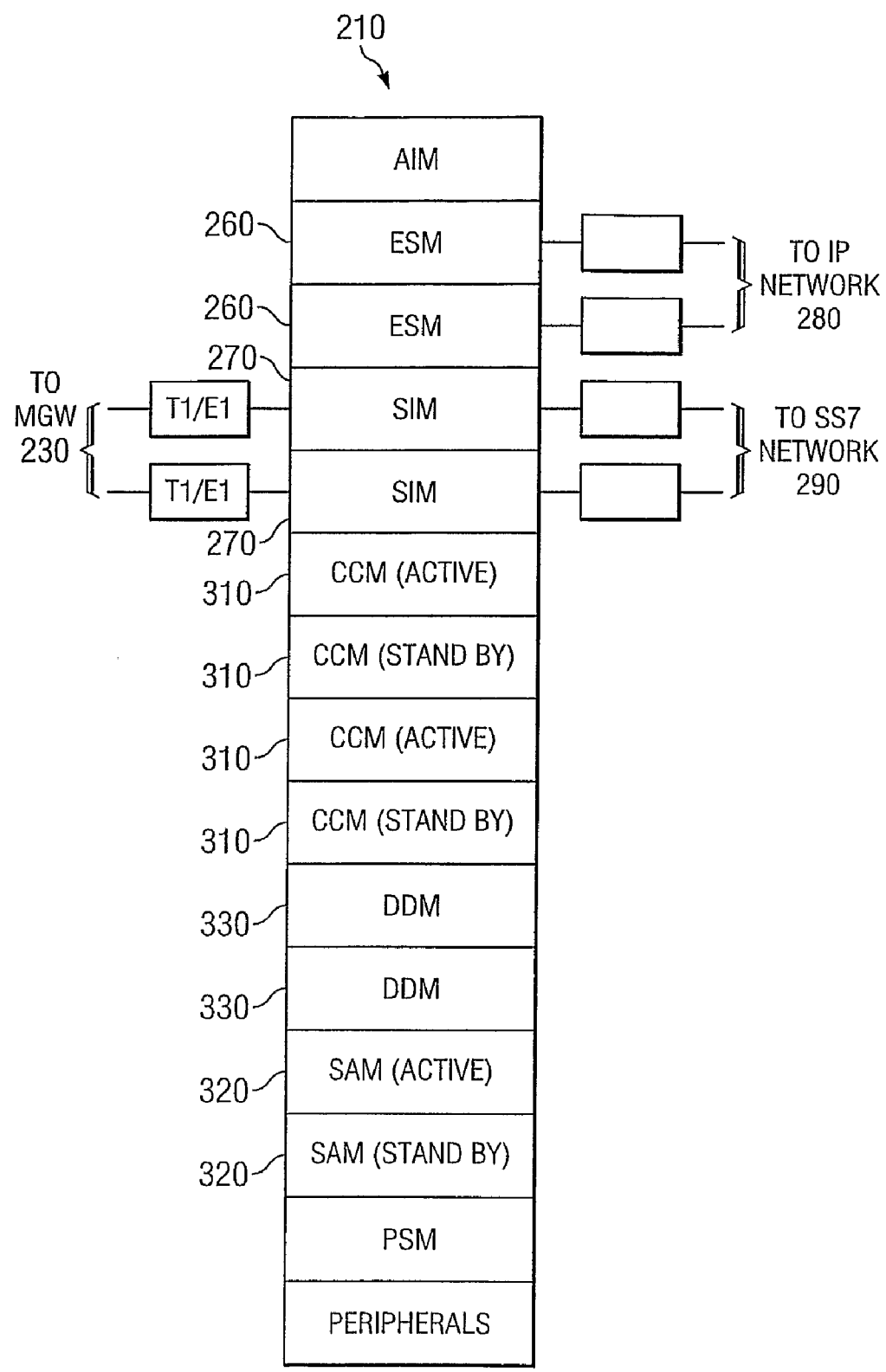

In an alternate embodiment in FIG. 2c, the main call server 210 does include active and standby cards, such as for CCM card 310 and SAM card 320. The redundant call server 220 may have the same active and standby cards. Though this embodiment requires additional equipment, it may be preferred for simplicity and additional protection. It is also possible that redundant call server 220 may have a somewhat different hardware configuration from the main call server 210, such as different hardware and software releases, or different number or types of cards provided that the hardware configuration is consistent.

The network nodes and call server illustrated in FIG. 2 are provided as one example of equipment that may perform the functionality of the present invention as defined in the claims. For example, functionality described herein in one or more cards may be combined into a single card or module, or additional functionality added or excluded, without varying from the scope of the present invention. In addition, other configurations, types of cards, interfaces and modules within telecommunications nodes may perform the same processes to achieve geographical and partial redundancy of the present invention.

Figure 3A:
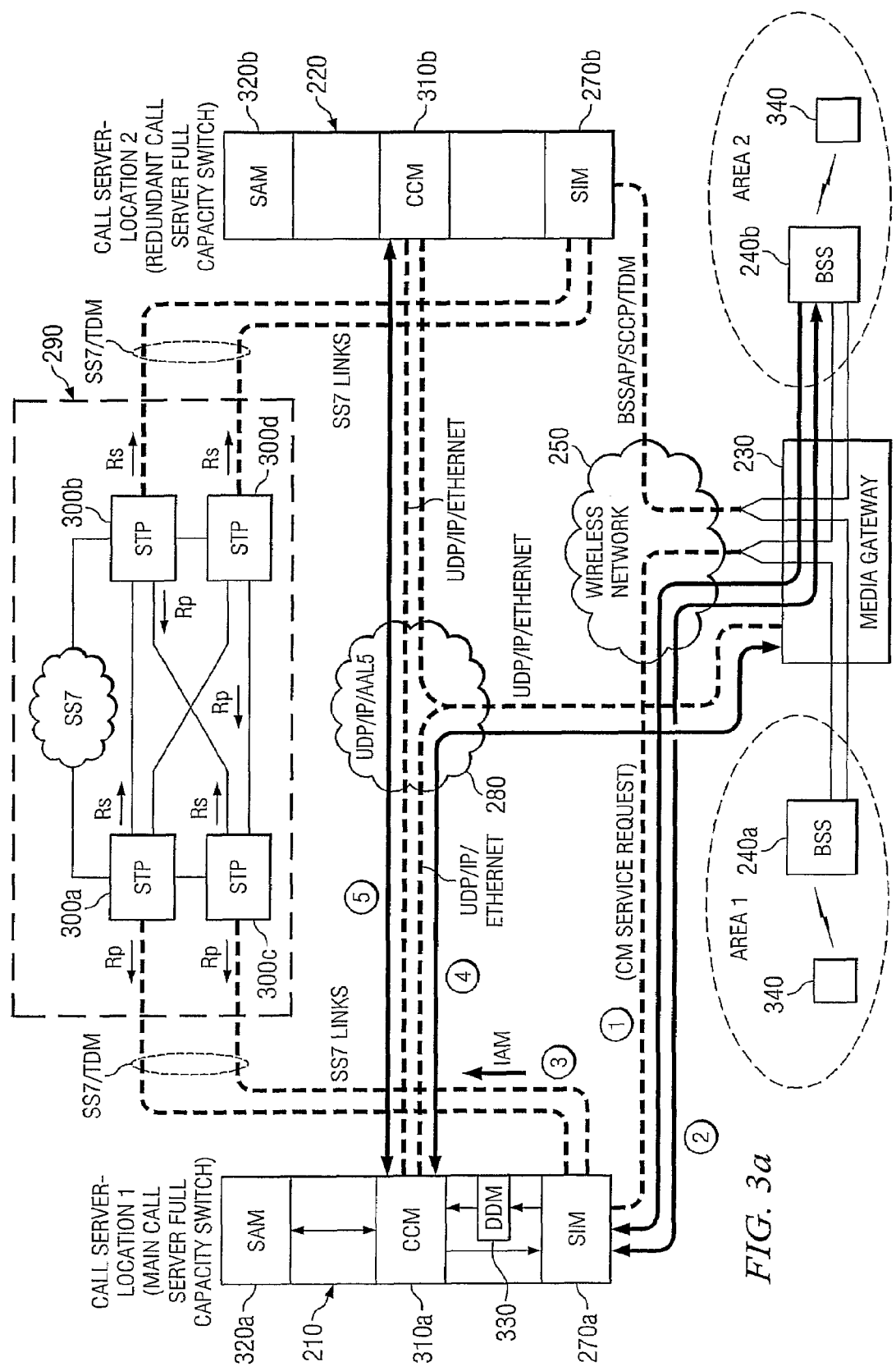
FIG. 3a illustrates an exemplary call establishment phase for a mobile to land call within the network architecture of FIG. 2.

Referring to FIG. 3a, an example of a mobile to land call within the architecture of FIG. 2 is illustrated. FIG. 3a provides the call establishment phase of the call during normal operations when the main call server 210 is active and the redundant call server 220 is on standby. In step 1, a mobile device 340b sends a call initiation request (such as a CM Service request message in GSM protocols or other appropriate protocol) to WMG 230 from the BSS 240b. The WMG 230 relays this call initiation request to the main call server 210 via the wireless network 250 over signaling link 232a. Given that the main call server 210 is in full operation, the WMG 230 switches and transmits all signaling messages, such as the call initiation request, to the signaling links 232a terminating on the main call server 270b in location 1. The redundant call server 220 receives no messages on signaling links 232b from the WMG 230. In step 2, upon receiving the call initiation request at the SIM card 270a, the main call server 210 initiates the necessary procedures with the BSS 240b and the mobile 340b in order to provide the requested services and authenticate the mobile 340b. The procedures include mobile Authentication, Cyphering, TMSI reallocation and radio resources assignment. In step 3, once the call initiation request is accepted, the main call server 210 sends an initial address message (such as an IAM message in the ISDN User Part protocol or other signaling type protocol) to the SS7 network 290 with destination as the "called party number" as requested by the mobile 340b. In step 4, the main call server 210 establishes the appropriate termination points at the WMG 230 to reserve the necessary resources for the call. In step 5, the main call server 210 synchronizes the call state information with the redundant call server 220 in location 2 by sending call state information over the IP network 280. This transfer ensures synchronization of real time call state information between the main call server 210 and redundant call server 220. Thus, if the CCM card 310a in the main call server 210 becomes inoperative during the call setup phase, the standby CCM card 310b in the redundant call server 220 can continue to process the call.

Figure 3B:
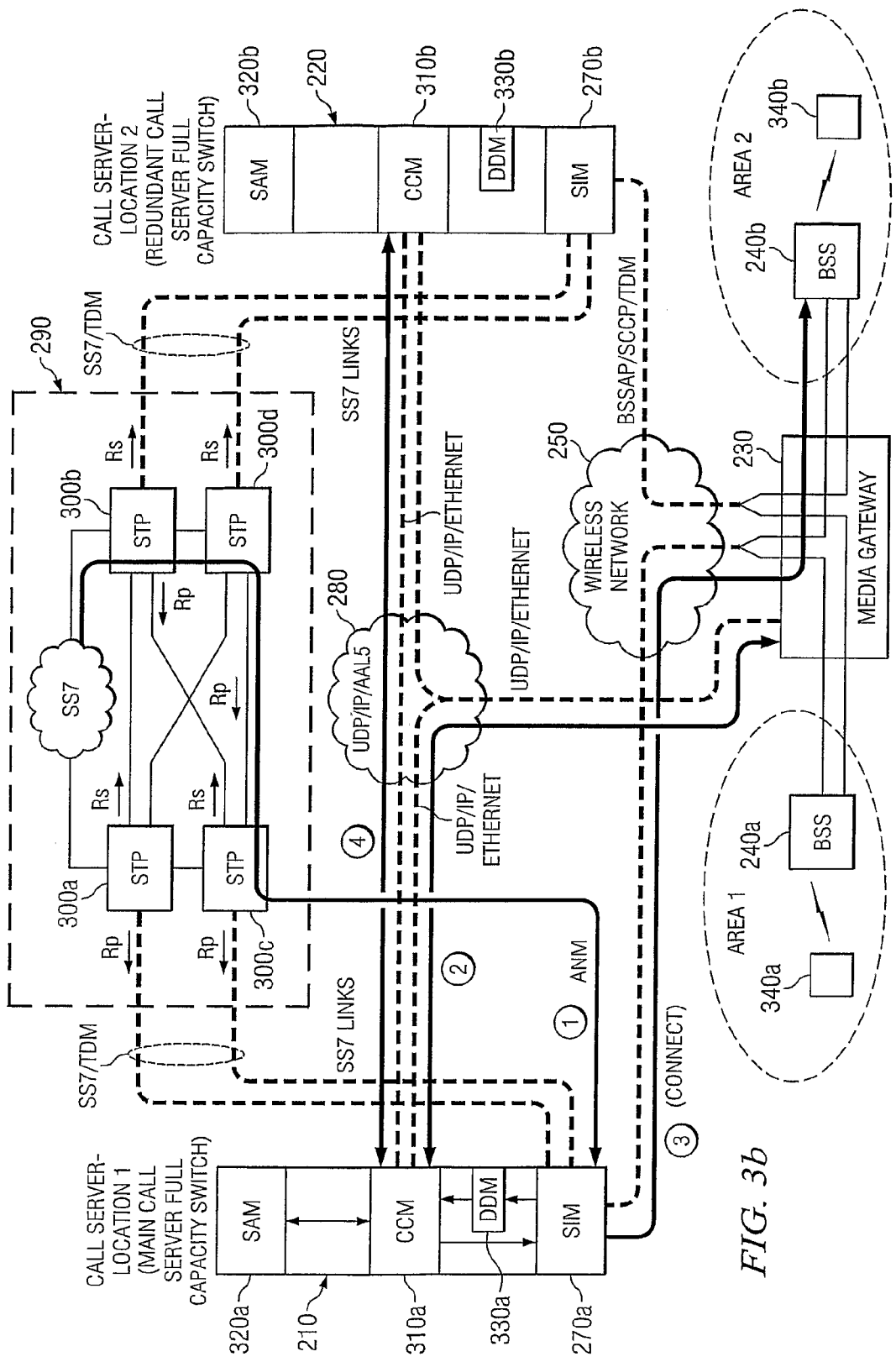
FIG. 3b illustrates an exemplary call answer phase for a mobile to land call within the network architecture of FIG. 2.

Referring to FIG. 3b, a continuation of the mobile to land call shown in FIG. 3a is illustrated for the call answer phase of the call. In step 1, a reply message (such as an ANM message in the ISDN User Part protocol or other signaling type protocol) is received at the main call server 210 from an STP 300c in the SS7 network 290. In step 2, the main call server 210 informs WMG 230 to complete the resource establishment for a 2-way connection. In step 3, the main call server 210 sends a connection message (such as a DTAP connect message or other protocol used to transfer messages from the MSC to the mobile) to the mobile 340b, hence connecting the mobile 340b with the called party. In step 4, the main call server 210 synchronizes the call state information with the redundant call server 220 in location 2 by transmitting the call state information over the IP network 280.

In addition to synchronization of the call state information, synchronization of billing data and VLR data between the main call server 210 and redundant call server can also be performed to facilitate switchover. The transfer of billing data in real time over the IP network 280 will minimize the loss of billing data after a switchover. The VLR data includes subscriber information of each subscriber currently in the service area of the main call server 210. So the synchronization of VLR data with the redundant call server 220 will reduce the call setup time and success rate for calls by subscribers after a switchover. If VLR data is not synchronized, it must be collected and stored on a call by call basis after a switchover.

FIG. 4 illustrates the operation of the present invention in the event that a telecommunication entity is completely unavailable. Though call servers are illustrated in the Figures, the same process may be followed for any other type of network entity. The complete switchover process 400 in the event of a complete failure of the active call server is illustrated in FIG. 4a. In this example, the main call server 210 is the active call server that becomes inoperative. In the first step 410, the standby call server, in this example redundant call server 220, will raise an alarm indicating that the main call server 210 is not operational. The mechanisms for monitoring status of main call server 210 and redundant call server 220 and raising an alarm is explained in more detail in relation to FIG. 6. A switchover process is then initiated in step 420 either manually through an element or network management system or automatically by the redundant call server 220. The switchover process involves two main parts. The first part is de-activating the active call server and the second part is activating the standby call server.

In the first part of de-activating the active call server, the following actions are taken by the active call server, in this case the main call server 210. The links to the main call server 210 from the SS7 network are locked, and no more communications are transmitted to the main call server 210 from the SS7 network 290 as shown in step 430. The SS7 network 290 is informed of the deactivation of the main call server 210 or has already detected its failure and stopped transmission to the main call server 210 over the primary route $R_p$. The communications by the main call server 210 to the MGW 230 are also halted in step 440. If not already aware of its status, the redundant call server 220 is informed of the unavailability of the main call server 210. The existing calls in the setup stage may be maintained if state information has been synchronized to the redundant call server 220. Otherwise, the calls may be dropped.

In the second part of the complete switchover process for activating the standby call server, the redundant call server 220 performs the following actions to become the active call server. The redundant call server 220 verifies that the main call server 210 is not operational in step 450. If verified, the redundant call server takes control of the MGW 230 in step 460. It transmits control message over the IP network 280 instructing the MGW 230 to use its IP addresses for sending management and administrative messages (such as status messages in SNMP protocol or other appropriate protocol) over the IP network 280—rather than the IP addresses of the main call server 210. The MGW 230 will then transmit any management and administrative messages (for example SNMP protocol messages or other appropriate types of protocols) over the IP network 280 to the redundant call server 220 using the IP addresses assigned to the redundant call server 220. The MGW 230 will also reconfigure its cross connections to switch the signaling channels from the BSS 340a and 340b received over signaling links 242 and 244 to the signaling links 232b terminating on the redundant call server 220 as shown in step 470. The SAM card 320b in the redundant call server 220 informs the other cards to start the processing of call requests from the MGW 230.

Since the links on the primary route ($R_p$) from the SS7 network to the main call server 210 are unavailable, the SS7 network 290 will begin to transmit signaling messages to the redundant call server 220 over the secondary route ($R_S$) as shown in step 480. The SS7 network 290 will only transmit to the active call server, now redundant call server 220, and so no traffic is transmitted over the primary route $R_P$ to the main call server 220. The redundant call server 220 will in turn unlock its SS7 links to the SS7 network and accept the messages from the SS7 network 290 received by its SIM card 270b.

The redundant call server 220 is now the active call server as shown in step 490. If VLR data was not synchronized prior to switchover, it must be collected and stored on a call by call basis by the redundant call server 220. The above switchover process can be repeated for any other media gateways in the network.

Figure 4B:
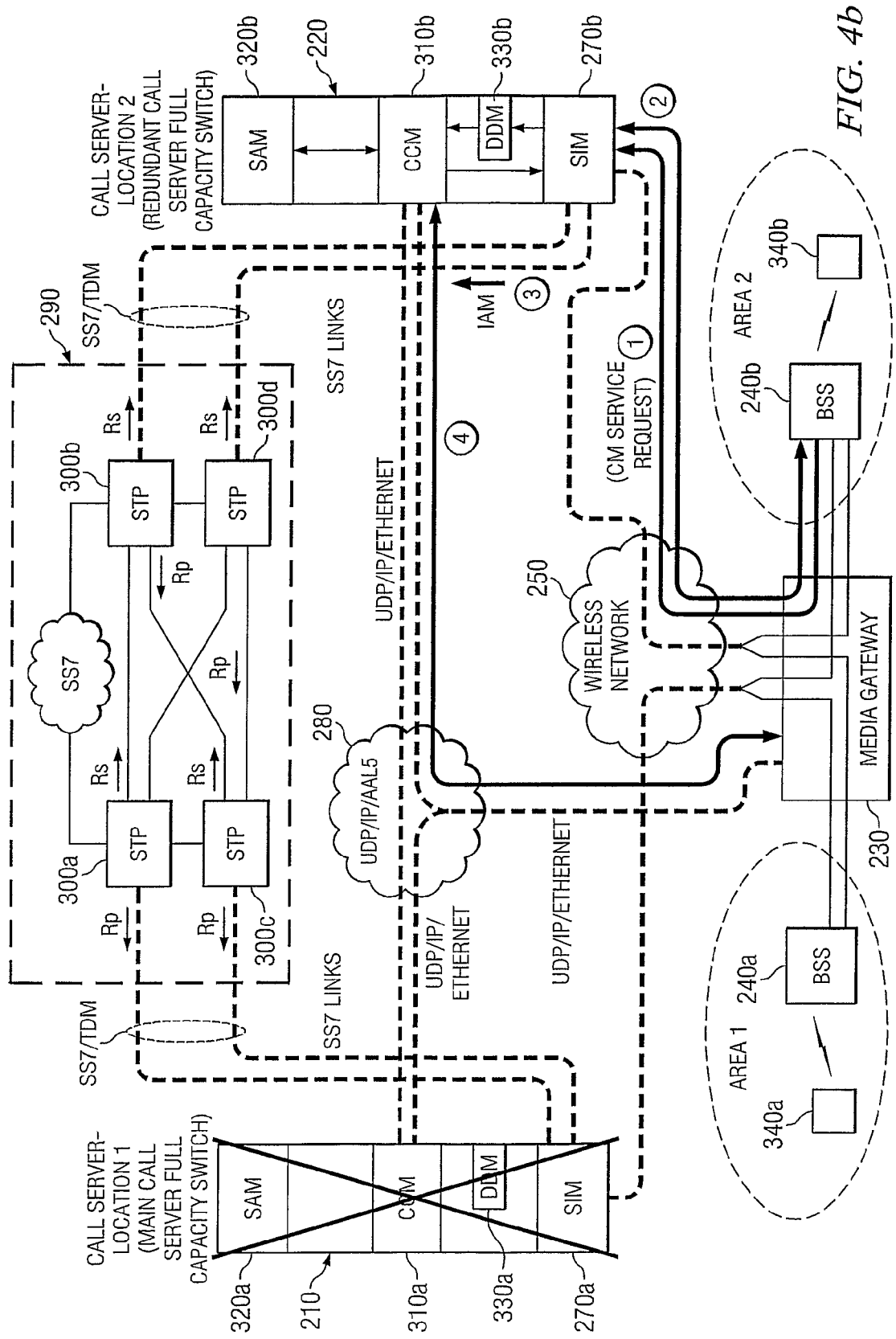
FIG. 4b illustrates an exemplary call establishment phase for a mobile to land call within the network architecture of FIG. 2 when the main call server is unavailable.

Referring to FIG. 4b, an example of a mobile to land call after the complete switchover to redundant call server 220 is illustrated. The example in FIG. 4b provides the call establishment phase of the call. In step 1, the mobile 340b sends a call initiation request to the wireless network 250. As explained above, the MGW 230 switches and transmits the signaling channels to the redundant call server 220 now acting as the active call server. In step 2, upon receiving the call initiation request from the mobile 340b, the redundant call server 220 starts the necessary procedures with the BSS 240b and the mobile 340b. These procedures include mobile Authentication, Cyphering, TMSI reallocation and radio resources assignment. In step 3, once the call is accepted, the redundant call server 220 in location 2 sends an initial address message (such as an IAM message in the ISDN User Part protocol or other signaling type protocol) out to the SS7 network 290 with destination as the "called party number" as requested by the mobile 340b. In step 4, the redundant call server 220 establishes the appropriate termination points at the WMG 230 to reserve the necessary resources for the call.

Figure 4C:
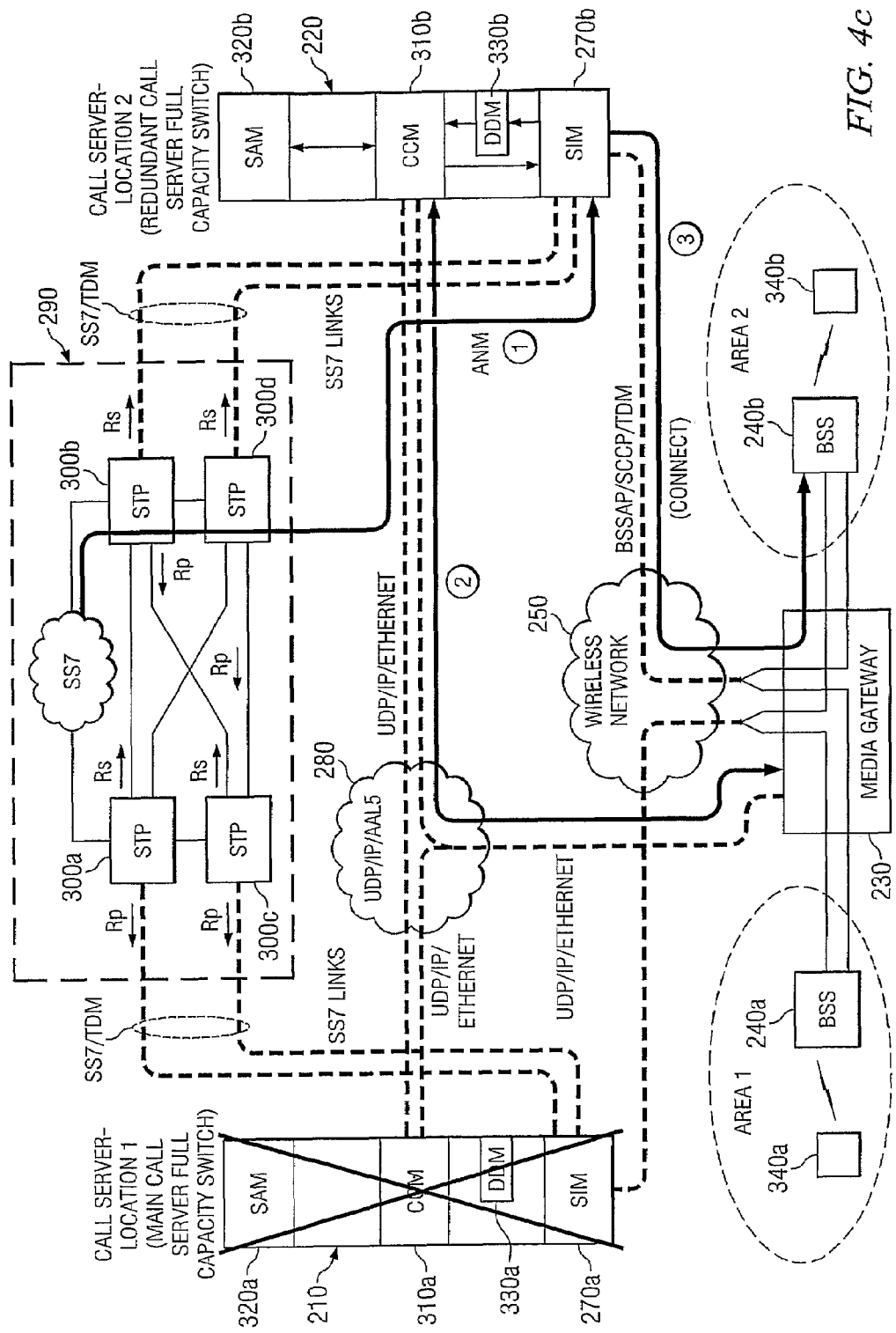
FIG. 4c illustrates an exemplary call answer phase for a mobile to land call within the network architecture of FIG. 2 when the main call server is unavailable.

Referring to FIG. 4c, a continuation of the mobile to land call shown in FIG. 4b is illustrated when the main call server 210 is unavailable. The example provides the call answer phase of the call. In Step 1, a reply message (such as an ANM message in the ISDN User Part protocol or other signaling type protocol) is received at the redundant call server 210 from the SS7 network 290 over the secondary route $R_s$. As explained above, the SS7 network 290 now uses the secondary route $R_S$ to transmit signaling message to the redundant call server 220 since the route $R_P$ to the main call server 210 in location 1 is not available. In step 2, the redundant call server 220 informs WMG 230 to complete the resources establishment for a 2-way connection. In step 3, the redundant call server 220 sends a connection message (such as a DTAP: Connect message in the GSM protocol) to the call originating mobile 340b, hence connecting the mobile 340b with the called party. Even though a mobile to land call was used for purposes of illustration, it is understood that a similar process may be applied to any call scenario, including mobile-to-mobile, land-to-mobile, land-to-land, and others.

FIG. 5 illustrates the operation of the network in the event of a partial failure of a telecommunication entity. Though call servers are illustrated in the figures, the same process may be followed for any other type of telecommunication entity. Referring to FIG. 5a, a partial switchover process 500 is illustrated from an active call server to redundant call server. A partial switchover may help prevent dropped calls and lost data that may occur in a complete switchover. In addition, it provides a more efficient use of resources of the active call server. A partial switchover can be performed if the active call server is not in complete failure and can still communicate with the SS7 network 290 and perform most of its primary functions. The active call server and standby call server can be configured to determine when a partial switchover is to be initiated versus a complete switchover to the redundant call server. For example, the active call server may be configured to perform a partial switchover upon failure of a specific type of one or more cards but perform a complete switchover in the event of failure of other types of cards. For example, if the active call server has a configuration as shown in FIG. 2b wherein standby cards are located only in the redundant call server, a partial switchover must occur in the event of active card failure in the main call server 210. However, if the active call server has a configuration as shown in FIG. 2c, a partial switchover may occur only in the event of active and standby card failure in the main call server 210.

In the example of FIG. 5a, the main call server 210 is the active call server and only its CCM card 310a becomes inoperative. The same process shown in FIG. 5a can be performed in the event of failure of one or more other cards or modules on an active call server or other network entity. In the first step 510, the main call server 210 determines that one of its cards, in this case the CCM card 310a, has become inoperative. When the CCM card 310a fails, alarms are generated and the SAM card 320a of the main call server 210 is notified of its failed status. The SAM card 320a informs all the other cards in the main call server 210 of the status of the failed CCM card 310a as shown in step 520. Since the main call server 210 is still operational except for the CCM card 310a and the links to the WMG 230 and SS7 network 290 are available, the main call server 210 does not initiate a complete switchover as described in FIG. 4a. Rather only a partial switchover is initiated in step 530. In step 540, the functions of the CCM card 310a are transferred to the CCM card 310b in redundant call server 310b. The SAM card 320a determines the IP address for the standby CCM card 310b in the redundant call server 220 and informs the other cards to transmit messages to the IP address for standby CCM card 310b rather than to CCM card 310a. The SAM card 320a also initiates a message over the IP network 280 to the SAM card 320*b* in the redundant call server 220 to activate the CCM card 310*b*. The WMG 230 will continue to transmit all BSS signaling channels to the links 232*a* terminating on the main call server 210 in location 1. In addition, the SS7 network will continue to transmit signaling messages to the main call server 210 over the primary route $R_P$.

Figure 5B:
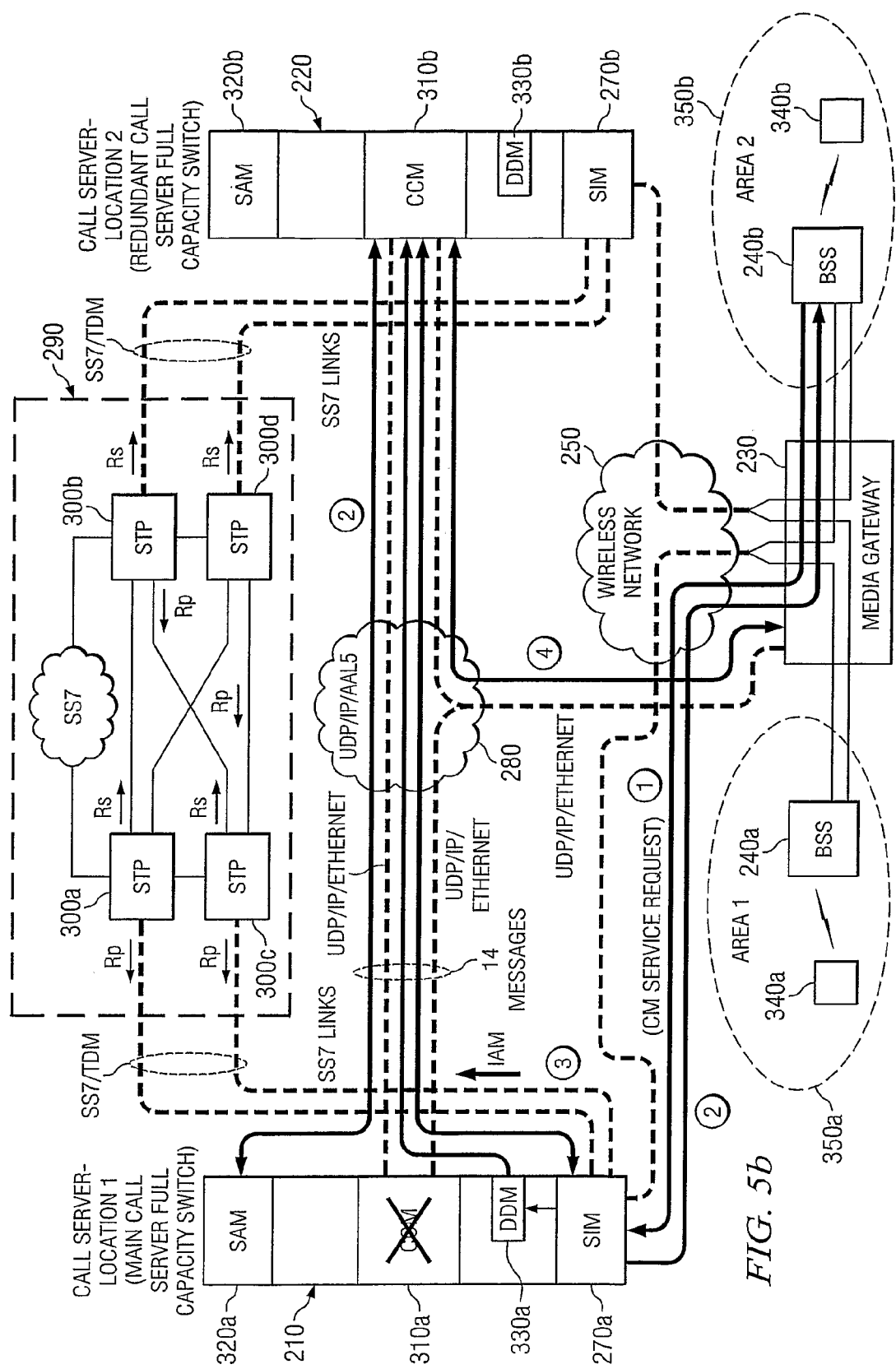
FIG. 5b illustrates an exemplary call establishment phase for a mobile to land call within the network architecture of FIG. 2 when the main call server has a partial failure.

FIG. 5*b* provides an example of a mobile to land call after a partial switchover when the main call server 210 has a failure of its CCM card 310*a*. The example in FIG. 5*b* provides the call establishment phase of the call. In step 1, the mobile 340*b* sends a call initiation request to the wireless network 230. The WMG 230 relays this message to main call server 210 via signaling links 232*a* over the wireless network 250. As explained above, since only a partial switchover occurred, the WMG 230 will continue to transmit all BSS signaling channels to the links terminating on the main call server 210 in location 1. In step 2, upon receiving the call initiation request, the DDM card 330*a* in the main call server 210 forwards the call request to the redundant CCM card 310*b* in the redundant call server 220. Since the DDM card 330*a* was previously informed of the partial switchover, it transmits the call requests over IP network 280 to the IP address of the CCM card 310*b*. Upon receiving the call initiation request, the CCM card 310*b* in the redundant call server 220 starts the necessary radio procedures with the BSS 240*b* and the mobile 340*b*. These procedures include mobile Authentication, Cyphering, TMSI reallocation and radio resources assignment. To complete the call establishment procedure, messages are exchanged between the CCM card 310*b* in the redundant call server 220 and the SAM card 310*a* in the main call server 210. These messages are exchanged over the IP network 280. In step 3, once the call is accepted, the main call server 210 transmits an initial address message (such as an IAM message in the ISDN User Part protocol or other signaling type protocol) message to the SS7 network 290 with destination as the "called party number" as requested by the mobile 340*b*. In step 4, the CCM card 310*b* in the redundant call server 220 establishes the appropriate termination points at the WMG 230 to reserve the necessary resources.

Figure 5C:
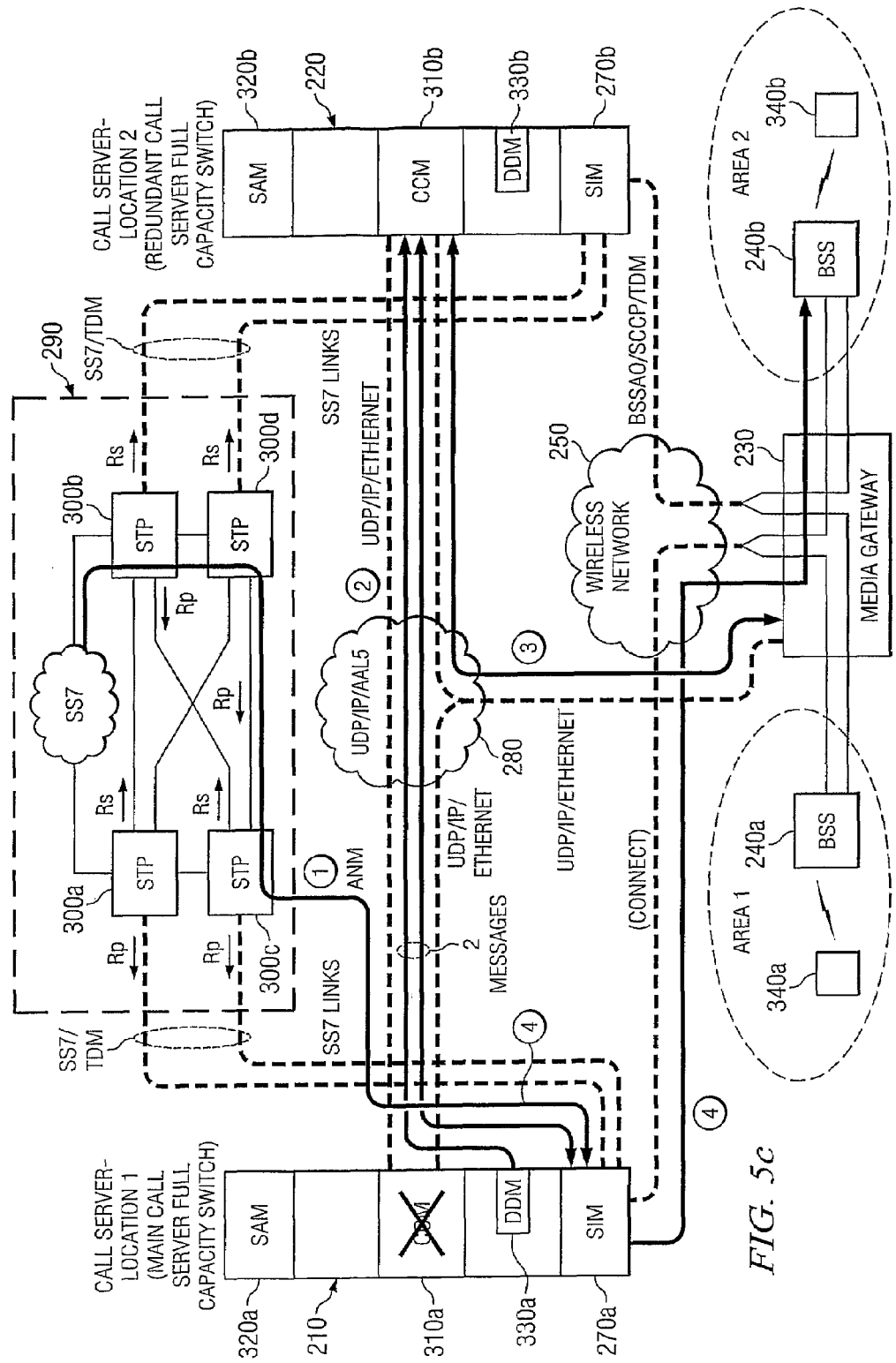
FIG. 5c illustrates an exemplary call answer phase for a mobile to land call within the network architecture of FIG. 2 when the main call server has a partial failure.

Referring to FIG. 5*c*, a continuation of the mobile to land call is illustrated when the main call server 210 has a partial failure. The example provides the call answer phase of a call. In step 1, a reply message (such as an ANM message in the ISDN User Part protocol or other signaling type protocol) is received from the SS7 network 290 at the main call server 210. As explained above, the SS7 network continues to transmit signaling messages to the main call server 210 over the primary route $R_P$. In step 2, upon receiving the reply message, the DDM 330*a* in the main call server forwards the message to the appropriate CCM card 310*b* in the call server 220 in location 2. In step 3, the CCM 310*b* in the redundant call server 220 informs WMG 230 to complete the resources establishment for a 2-way connection. In step 4, the CCM 310*b* in the redundant call server 220 then transmits a connection message (such as a DTAP: Connect message in the GSM protocol) to the call originating mobile 340*b* via the SIM card 270*a* in the main call server 210 in location 1. The mobile is now connected to the called party. Even though a mobile to land call was used for purposes of illustration, it is understood that a similar process may be applied to any call scenario, including mobile-to-mobile, land-to-mobile, land-to-land, and others.

The above example of the CCM card 310*a* failure was used to represent a partial failure scenario in the main call server 210. The above described process may similarly be applied to any card failure in the active call server, such as failure of a SAM card. Also, even though one CCM card was used to describe a partial failure scenario above, the present disclosure may be applied to failures of multiple cards and to any kind of failure in a call server. In addition, even though all the signaling traffic was described above as being transmitted to the main call server 210 from the MGW 230 and SS7 network 290, the present disclosure may be applied to other scenarios wherein the traffic load from the MGW 230 and SS7 network 290 is shared and sent to either the main call server 210 or the redundant call server 220. In this alternative concept, there may be no need to configure primary and secondary routes in the SS7 network, and none of the SS7 links from the MGW 230 or the SS7 network to the redundant call server 220 need to be blocked. The traffic load on the IP network between the main call server 210 and the redundant call server 220 may increase due to synchronization of call processing and data. In addition, the CCM cards can then route the call messages to the appropriate SIM cards in the main call server 210 or redundant call server 220 in order to balance the load between the main and the redundant call servers.

Furthermore, even though the standby CCM cards are described as located in the redundant call server 220, the present disclosure may also be applied if the standby CCM cards are located in the main call server 210 with the other active CCM cards as shown in FIG. 2*c* above. In this case, during CCM card failure, the messages may be forwarded to the standby CCM card in the same call server. The partial switchover described above may also be applied if both active and standby CCM cards in the same call server fail.

The mechanism to provide status of the main call server 210 and redundant call server 220 is now described with respect to FIG. 6. A status or "heartbeat" message is used to inform the call servers 210 and 220 in both locations about the availability of the other call server. This signal informs each call server of the other's status, such as that the other call server is active and is handling calls with no problems. This procedure allows the redundant call server 220 to know when to take over a service when the main call server 210 cannot process calls, and the main call server 210 to take over the service from the redundant call server 220 after it has fully recovered.

The heartbeat procedure includes transferring a message from one location to another on a periodic basis. The transmission frequency may be configurable and defined in the call server. If a call server does not receive a primary heartbeat over a first network, it may use another mechanism to exchange a secondary heartbeat over a different network. If the secondary heartbeat is not received, the call server is configured to assume that the other call server has a problem and cannot handle any calls. A switchover process can then be initiated.

Figure 6A:
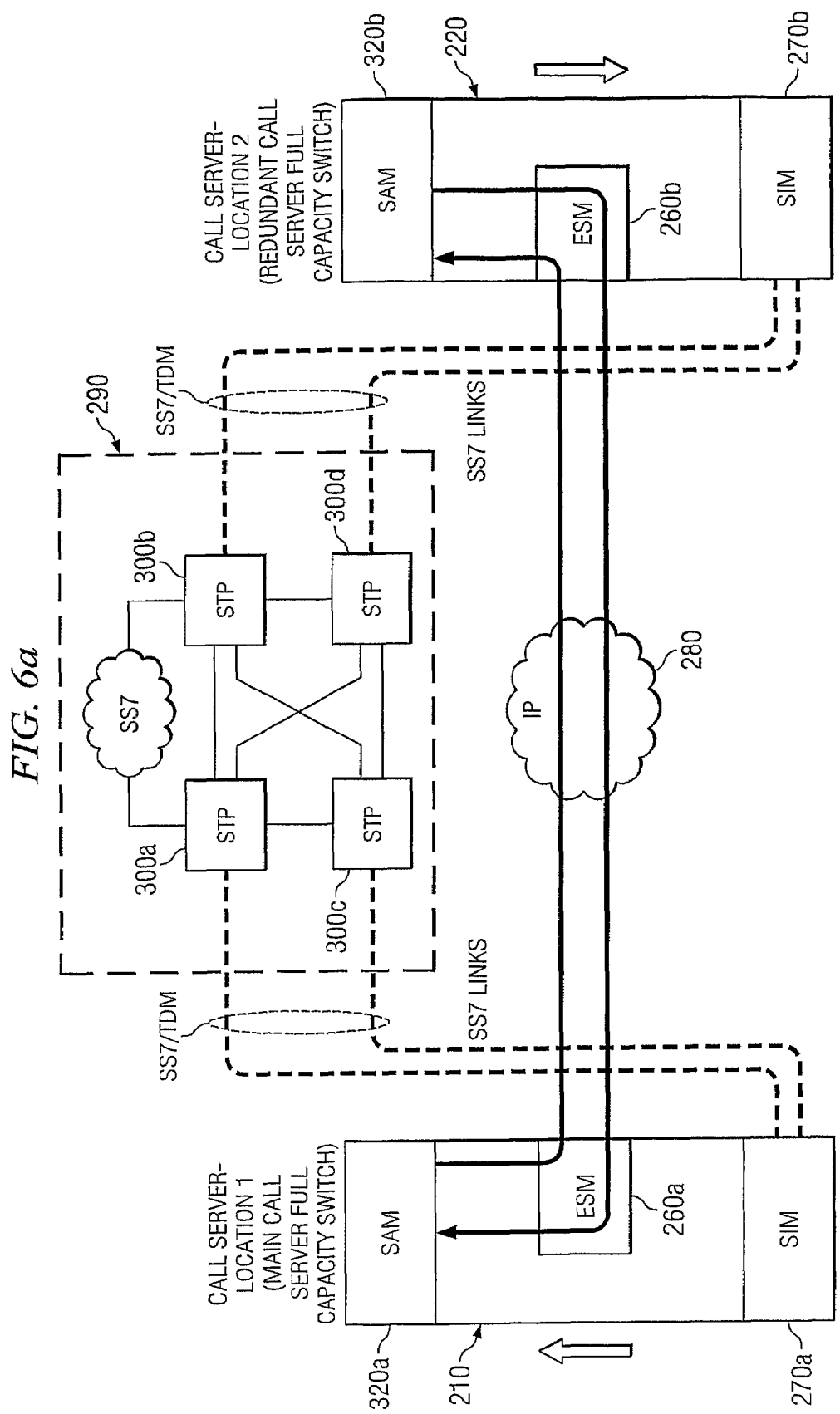
FIG. 6a illustrates an IP-based heartbeat operation between a main and a redundant call server when an IP network is operational.

Referring to FIG. 6*a*, in one embodiment, a primary heartbeat solution is presented to inform each of the call servers 210 and 220 of their respective status. In this solution, each call server 210 and 220 sends an IP-based heartbeat message to the other call server over the IP network 280. This message is initiated from the SAM card 320*a* and 320*b* of each call server and sent to the local ESM card 260. The local ESM card 260 forwards the message over the IP network 280 to the ESM card 260 located in the other call server. The ESM card 260 receiving the message then forwards the message to its local SAM card 320. In this scenario, it is considered that the main call server 210 in location 1 is active and processing calls, while the redundant call server 220 in location 2 is in standby mode.

Figure 6B:
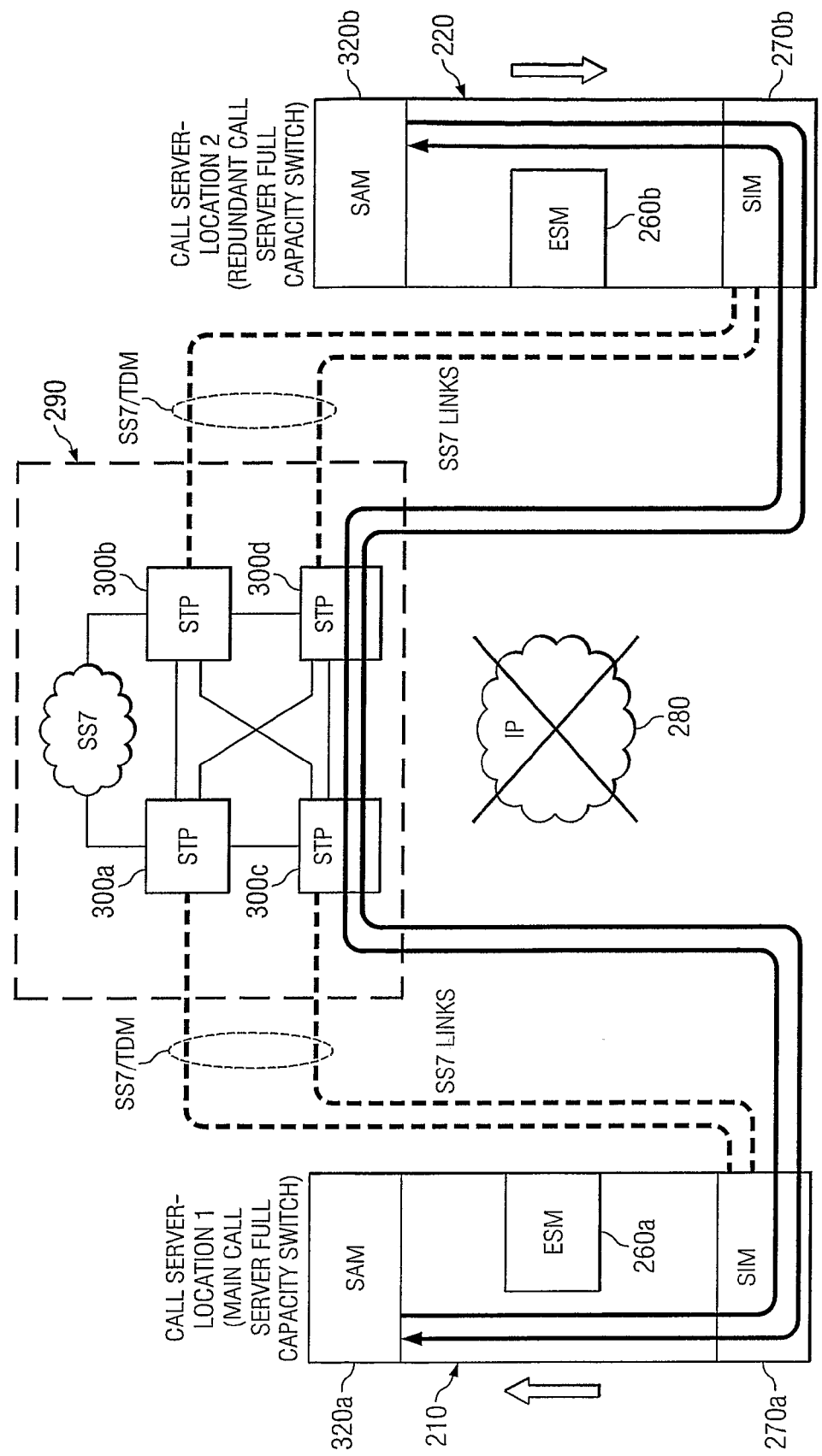
FIG. 6b illustrates an SS7-based heartbeat operation between a main and a redundant call server when an IP network is not operational.

Referring to FIG. 6b, a secondary heartbeat solution over a different network is presented to inform the call servers of their status. This secondary heartbeat mechanism may be used alternatively when the primary heartbeat message over the IP network (FIG. 6a) is not received from the other call server. After a heartbeat timer expires after a configurable time period without receipt of a heartbeat signal over the IP network, a call server may send a secondary heartbeat message using the SS7 network. To achieve this, the SAM card 320a transmits a trigger to the SCCP application residing on its local SIM card 270a. The SIM card 270a then sends an "SCCP Connection Request" message to the SIM card 270b in the redundant call server 220 over the SS7 network 290. Another solution includes having the SCCP application transmit a subsystem test message (such as a SubSystem_Test (SST)) to the SIM card 270b in the redundant call server 220 over the SS7 network 290. The SCCP messages "Connection Request" and "SubSystem Test" are merely representative of two types of messages that may be used for the secondary heartbeat message between call servers over the SS7 network 290. Other types of messages or other protocols may be used to transmit similar information over a different network.

In either solution, each call server is equipped with and identified by a different Point Code (PC). This PC may be private and may not be known to any other node in the network. When the SIM card 270b in the redundant call server 220 receives the SCCP message, it transmits a trigger to its local SAM card 320b, informing it the main call server 210 is available. The secondary heartbeat messages over the SS7 network 290 may be achieved by having each call server transmit an SCCP message on a periodic basis. The period of heartbeat transmission may be the same as that used for the primary heartbeat over the IP network 280, or may be another configurable parameter. In this scenario, the main call server 210 in location 1 is active and processing calls, while the redundant call server 220 in location 2 is on standby during the duration of the IP network failure 280. After the primary heartbeat over the IP network is resumed, the secondary heartbeat messages via the SS7 network 290 can be suspended.

This method of transmitting a heartbeat message over two different networks prevents unnecessary switchovers. For example, in FIG. 6b, if only an IP heartbeat message over the IP network 280 was implemented, a complete switchover may have occurred to the redundant call server 220 without need. Such an unneeded switchover could result in dropped calls and delay and require a further switchover back from the redundant call server 220 to the main call server 210. Thus, the secondary heartbeat message over a different network, in this case an SS7 network, prevents unneeded switchovers in the event that the first network becomes unavailable.

Figure 6C:
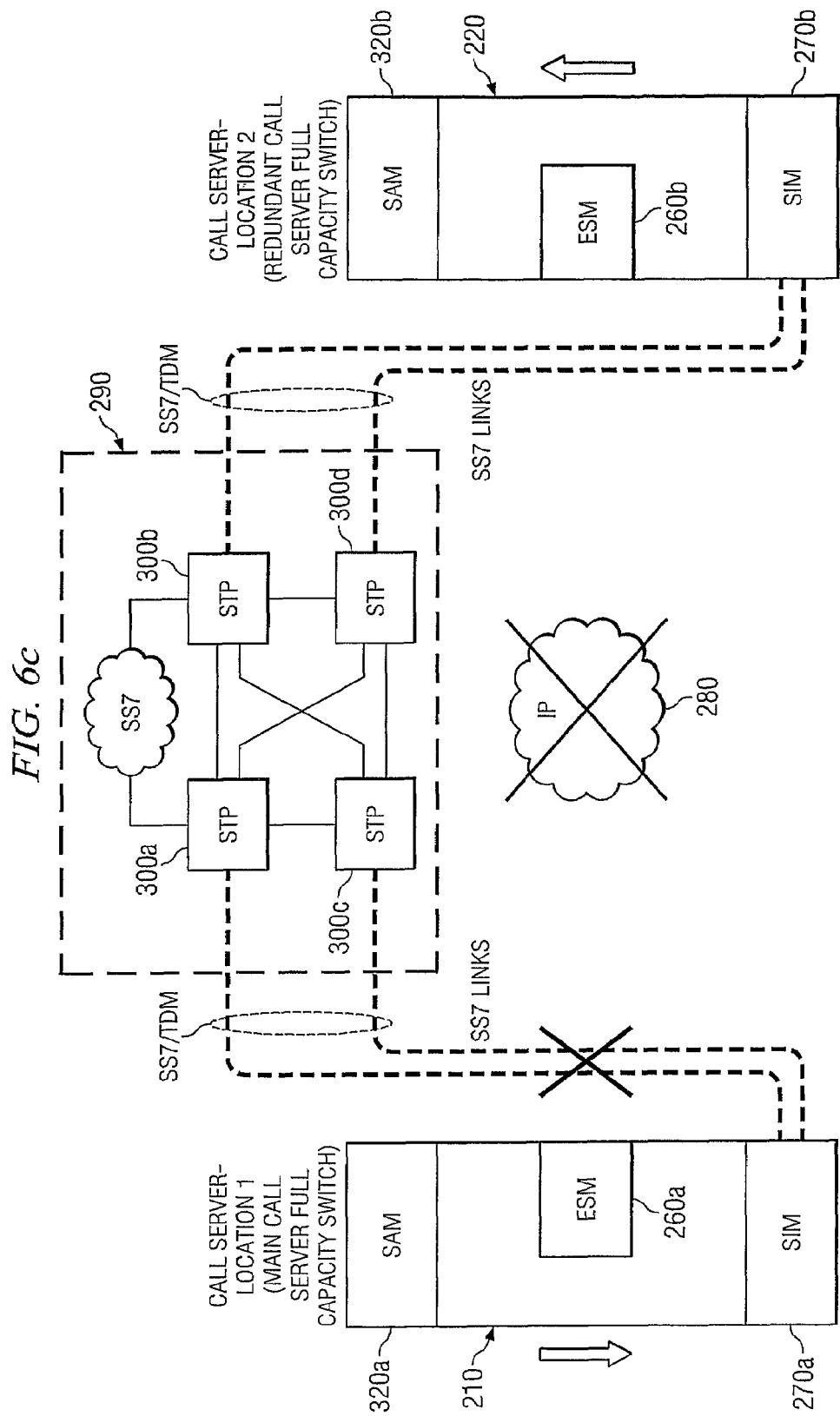
FIG. 6c illustrates a call server switchover from a main to a redundant call server when the main call server becomes isolated and the IP network between the call servers is not operational.

Referring to FIG. 6c, an example is illustrated where the heartbeat of the main call server 210 is not received at the redundant call server 220 because the IP network 280 and the SS7 links at the main call server 210 are down. In this case, after expiration of a configurable time period, the switchover process in FIG. 4a is initiated wherein the redundant call server 220 becomes the active call server.

Figure 6D:
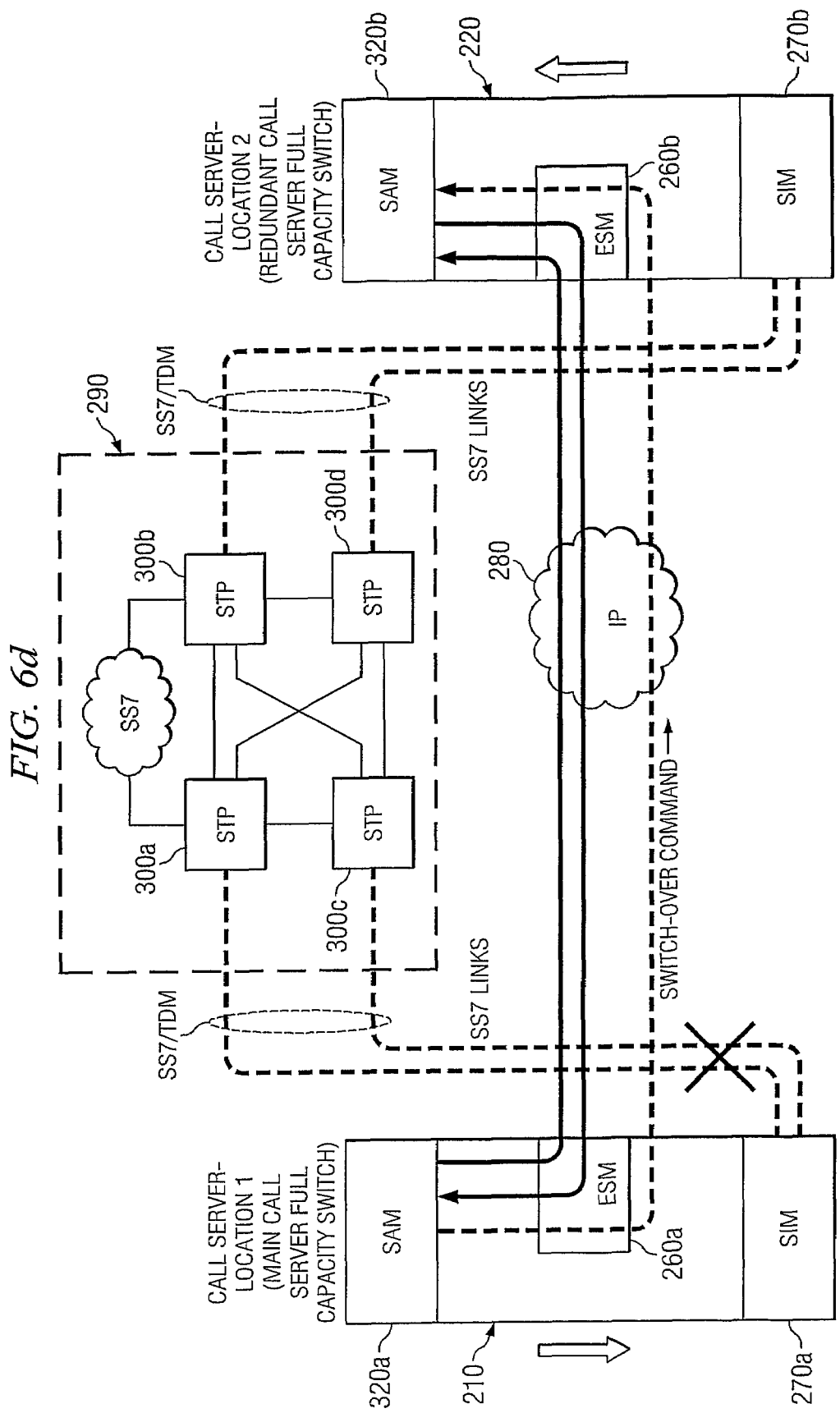
FIG. 6d illustrates a call server switchover from a main to a redundant call server when the main call server becomes isolated and the IP network between the call servers is operational.

Referring to FIG. 6d, an example is illustrated where the IP heartbeat of the main call server 210 is exchanged over the IP network 280 successfully. However, the SS7 links are down in the main call server 210. With this limitation, the main call server 210 cannot handle calls, and it initiates a switch-over command to the redundant call server 220 by requesting that the redundant call server 220 bring itself into service and take over all the calls as described in FIG. 4a.

Figure 6E:
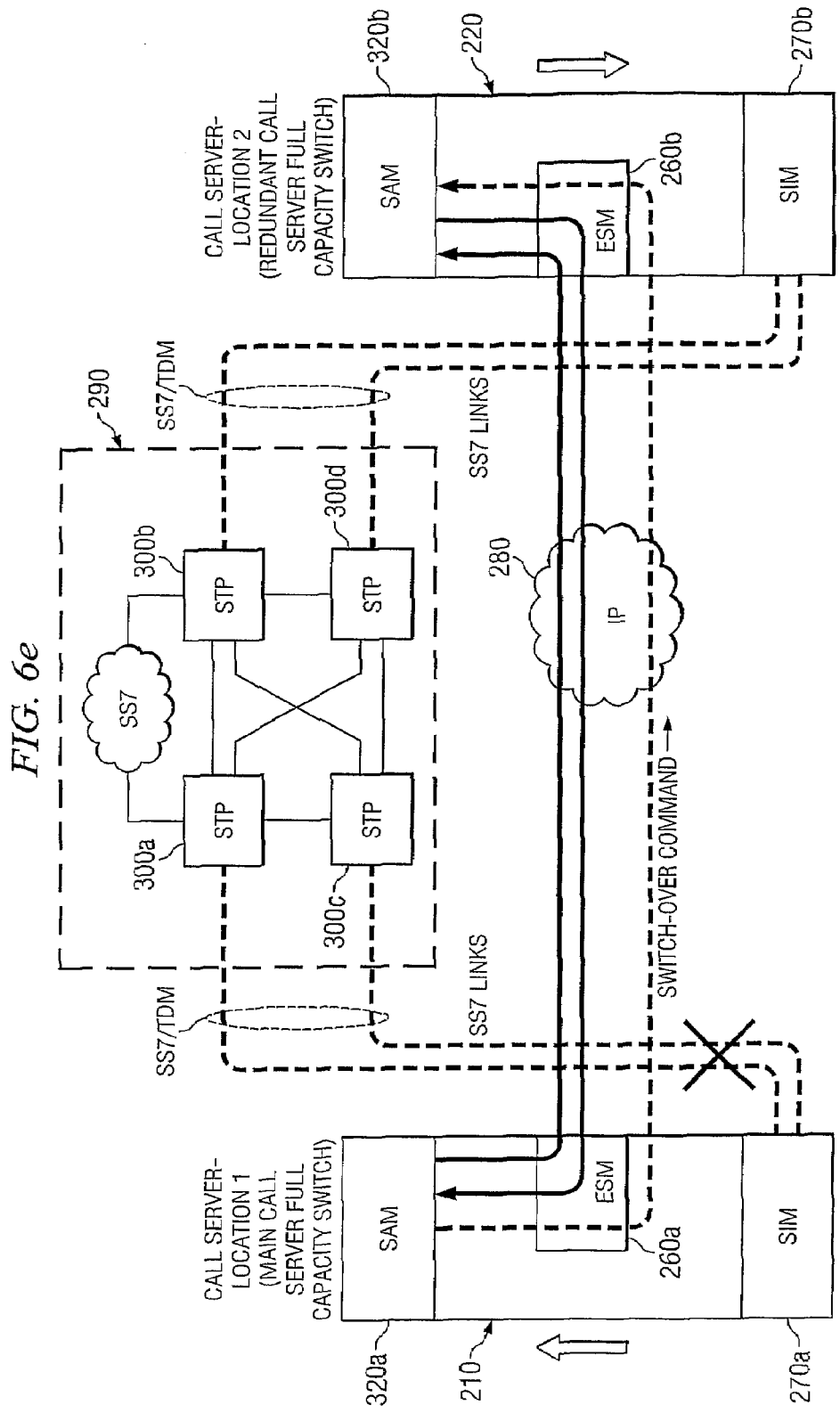
FIG. 6e illustrates a call server switchover from a redundant to a main call server when the main call server recovers and becomes fully operational and the IP network between the call servers is operational.

Referring to FIG. 6e, an example is illustrated where, after the SS7 links at the main call server 210 are recovered, it initiates a switch-back command to the redundant call server 220 by requesting that the redundant call server 220 transfer control to the main call server 210. A similar process is then followed as described in FIG. 4a, except that the redundant call server performs actions required to transfer to standby mode and the main call server becomes active.

Accordingly, the present disclosure provides reliability in a telecommunication network entity despite events that affect an entire geographical location, such as fire, earthquake, etc. In addition, it provides an efficient partial switchover process in the event of failure of only one or more modules, for example due to hardware stress, and hardware failure, as well as other causes such as software failures and others. Furthermore, a primary and secondary heartbeat message are transmitted over different networks to prevent unneeded switchovers.

The above disclosure provides many different embodiments, or examples, for implementing the disclosure. However, specific examples, and processes are described to help clarify the disclosure. These are, of course, merely examples and are not intended to limit the disclosure from that described in the claims. For instance, even though a wireless telecom entity was used for purposes of illustration, the present disclosure may be applied to wireline telecom entities. In addition, even though a soft-switch was used in the various embodiments, the present disclosure may be applied to any switch technology, including those that do not use a physical split between the bearer and signaling plans. Also, even though a wireless network and wireless services were used to describe the disclosure, the present disclosure may be applied to non-wireless applications and non-wireless networks.

While the disclosure has been particularly shown and described with reference to the preferred embodiment thereof, it will be understood by those skilled in the art that various changes in form and detail may be made therein without departing from the spirit and scope of the disclosure, as set forth in the following claims.

We claim:

1. A system for providing redundancy for an entity in a telecommunications network, the system comprising: a first network entity of a first network, adapted to send and receive traffic; and a second network entity, of a second network, configured to operate as a standby network entity, wherein the second network entity takes control of only a portion of the functions of the first network entity in response to a partial failure in the first network entity when a failure to receive either a primary status message by the second network over the first network or a secondary status message from the first network over the second network.

2. The system for providing redundancy for an entity in a telecommunications network in claim 1, wherein the first network entity has a plurality of cards for performing various functions, and a partial failure occurs in a first type of card of the first network entity.

3. The system for providing redundancy for an entity in a telecommunications network in claim 2, wherein the second network entity has at least the first type of card and wherein the first type of card of the second network entity performs functions for the first type of card in the first network entity in response to its partial failure.

4. The system for providing redundancy for an entity in a telecommunications network in claim 1, wherein the first network entity is in a first location and the second network entity is in a second location that is geographically remote from the first location.

5. The system for providing redundancy for an entity in a telecommunications network in claim 1, wherein the first network entity further comprises: a system and administration module for transmitting a primary status message over a first network to the second entity and a secondary status message over a second network to the second entity.

6. The system for providing redundancy for an entity in a telecommunications network in claim 5, wherein the first network is an IP network and wherein the second network is a signaling network.

7. A method for providing redundancy for an entity in a telecommunications network, the method comprising: detecting that a first call server has become partially or completely disabled; determining that no primary status message has been received by the first call server over a first network; determining that no secondary status message has been received by the second call server over a second network; and redirecting at least a portion of traffic from the first call server to the second call server in a geographically remote location.

8. The method of claim 7, wherein the step of detecting that a first call server has become partially or completely disabled comprises: transmitting a status message over a first type of network by the first call server to the second server with information that a partial failure has occurred in a first specific type of card in the first call server.

9. The method of claim 8, wherein the step of redirecting traffic comprises: informing other cards in the first call server to redirect messages for the first specific type of card in the first call server to an address for a second specific type of card in the second call server.

10. The method of claim 7, wherein the step of detecting that a first call server has become partially or completely disabled comprises: failing to receive a primary status message from the first call server over a first network after a first time period; failing to receive a secondary status message from the first call server over a second network after a second time period; and determining that the first call server has become completely disabled.

11. The method of claim 10, wherein the step of redirecting at least a portion of traffic from the first call sewer to a second call sewer comprises the steps of: initiating a switchover process to the second call server of all the traffic of the first call server; terminating communications from the first call server over any connected signaling links; switching communications to signaling links connected to the second call server; and processing of the traffic by the second call server.

12. The method of claim 10, wherein the step of failing to receive a primary status message from the first call sewer over a first network after a first time period comprises failing to receive an IP heartbeat message from the first call sewer over an IP network after a first time period.

13. The method of claim 12, wherein the step of failing to receive a secondary status message from the first call server over a second network after a second time period comprises failing to receive an signaling message from the first call server over a signaling network after a second time period.

14. The method of claim 13, wherein the signaling message is an Signaling Connection Control Part (SCCP) message and the signaling network is an Signaling System 7 (SS7) network.

15. A method for providing redundancy for an entity in a telecommunications network, the method comprising: transmitting a primary status message over a first network from a standby network entity to an active network entity; determining that no primary status message has been received from the active network entity by the standby network entity over the first network; transmitting a secondary status message over a second network from the standby network entity to the active network entity; determining that no secondary status message has been received from the first active network entity by the standby network entity over the second network; and initiating a switchover of traffic control from the active network entity to the standby network entity.

16. The method of claim 15 for providing redundancy for an entity in a telecommunications network, wherein the step of transmitting a primary status message over a first network from a standby network entity to an active network entity further comprises: transmitting an IP message over an IP network from the standby network entity to the active network entity on a periodic basis.

17. The method of claim 16 for providing redundancy for an entity in a telecommunications network, wherein the step of determining that no primary status message has been received from the active network entity by the standby network entity over the first network further comprises: determining that no primary status message has been received from the active network entity by the standby network entity over the first network after a first configurable time period.

18. The method of claim 17 for providing redundancy for an entity in a telecommunications network, wherein the step of transmitting a secondary status message over a second network from the standby network entity to the active network entity, further comprises: transmitting the secondary status message over an signaling system 7 (SS7) network from the standby network entity to the active network entity on a periodic basis.

19. The method of claim 18 for providing redundancy for an entity in a telecommunications network, wherein the step of determining that no secondary status message has been received from the first active network entity by the standby network entity over the second network, further comprises: determining that no secondary status message has been received from the first active network entity by the standby network entity over the second network after a second configurable time period.

20. The method of claim 19 for providing redundancy for an entity in a telecommunications network, wherein the step of initiating a switchover of traffic control from the active network entity to the standby network entity, further comprises: terminating communications to the active network entity over any connected signaling links; and switching communications to signaling links connected to the standby network entity.

21. The method of claim 20 for providing redundancy for an entity in a telecommunications network, wherein the active network entity and the standby network entity are in geographically different locations.

* * * * *

UNITED STATES PATENT AND TRADEMARK OFFICE
CERTIFICATE OF CORRECTION

PATENT NO. : 7,577,090 B2  Page 1 of 1
APPLICATION NO. : 10/597950
DATED : August 18, 2009
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

Signed and Sealed this

Seventh Day of September, 2010

David J. Kappos
*Director of the United States Patent and Trademark Office*